United States Patent
Sourour et al.

(10) Patent No.: US 6,363,105 B1
(45) Date of Patent: Mar. 26, 2002

(54) FLEXIBLE SLIDING CORRELATOR FOR DIRECT SEQUENCE SPREAD SPECTRUM SYSTEMS

(75) Inventors: Essam Sourour, Raleigh; Greg Bottomley, Cary; David Barrow, Durham; Rajaram Ramesh, Cary; Clarence V. Roberts, Raleigh, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/024,120

(22) Filed: Feb. 17, 1998

(51) Int. Cl.[7] .................. H04L 27/30; H04L 27/06; H03D 1/00
(52) U.S. Cl. .................. 375/150; 375/343; 329/358
(58) Field of Search .................. 375/208, 343, 375/200, 207, 209, 349, 350, 229; 708/422, 425; 329/358, 351, 323

(56) References Cited

U.S. PATENT DOCUMENTS

| | | | |
|---|---|---|---|
| 4,550,414 A | | 10/1985 | Guinon et al. .............. 375/207 |
| 4,642,567 A | * | 2/1987 | Kaplan ....................... 324/309 |
| 5,005,185 A | * | 4/1991 | Mizoguchi et al. ......... 375/235 |
| 5,099,243 A | * | 3/1992 | Tsui et al. ..................... 324/78 |
| 5,216,691 A | * | 6/1993 | Kaufmann ................... 375/206 |
| 5,218,619 A | | 6/1993 | Dent ........................... 370/209 |
| 5,237,586 A | | 8/1993 | Bottomley ................... 370/206 |
| 5,255,292 A | * | 10/1993 | LaRosa et al. .............. 375/368 |
| 5,295,153 A | | 3/1994 | Gudmundson .............. 370/335 |
| 5,406,586 A | * | 4/1995 | Wang .......................... 375/343 |
| 5,422,909 A | * | 6/1995 | Love et al. .................. 375/200 |
| 5,425,049 A | | 6/1995 | Dent ........................... 375/202 |
| 5,440,583 A | * | 8/1995 | Koike .......................... 375/233 |
| 5,572,552 A | | 11/1996 | Dent et al. .................. 375/343 |
| 5,615,209 A | | 3/1997 | Bottomley ................... 370/342 |
| 5,689,528 A | * | 11/1997 | Tsujimoto ................... 375/233 |
| 5,848,096 A | * | 12/1998 | Shou et al. .................. 375/207 |
| 5,903,597 A | * | 5/1999 | Pon ............................. 375/209 |
| 5,920,287 A | * | 7/1999 | Belcher et al. ............. 342/450 |
| 5,982,810 A | | 11/1999 | Nishimori ................... 375/208 |

FOREIGN PATENT DOCUMENTS

| | | |
|---|---|---|
| EP | 0 749 223 A1 | 12/1996 |
| EP | 0 810 741 A2 | 12/1997 |
| WO | 96/41432 | 12/1996 |

OTHER PUBLICATIONS

Mamoru Sawahashi, Fumiyuki Adachi, Guoliang Shou and Changming Zhou, Members, "Low–Power Consuming Analog–Type Matched Filter For DS–CDMA Mobile Radio", IEICE Trans. Fundamentals, vol. E79–A, No. 12, Dec. 1996, pp. 2071–2077.

Brima B. Ibrahim and A. Hamid Aghvami, "Direct Sequence Spread Spectrum Matched Filter Acquisition In Frequence–Selective Rayleigh Fading Channels", IEEE Journal on Selected Areas in Communications, vol. 12, No. 5, Jun. 1994, pp. 885–890.

"Spread Spectrum Communications", by M.K. Simon, J.K. Omura, R.A. Scholz and B.K. Levitt, vol. III, Computer Science Press, 1985, pp. 66–75.

* cited by examiner

*Primary Examiner*—Chi Pham
*Assistant Examiner*—Khai Tran
(74) *Attorney, Agent, or Firm*—Myers Bigel Sibley & Sajovec

(57) ABSTRACT

A flexible sliding correlator for use in a spread spectrum receiver divides baseband signal samples into different groups, associates each group with a different section of a spreading code, and combines ones of the signal samples with corresponding values in the spreading code section. The groupings and spreading code sections can be changed during operation of the receiver to maximize performance of the receiver under different or changing conditions. In addition, the sample and spreading code value combinations can be further combined in different ways, and the further combinations can be changed during operation of the receiver. According to another aspect of the invention, the baseband signal can be sampled either uniformly or non-uniformly. The phase and frequency of the baseband sampling can be adjusted during operation of the receiver so that samples are taken very close to the optimum sampling position, at the peak of a chip waveform in the baseband signal.

24 Claims, 13 Drawing Sheets

Conventional Sliding Correlator

FLEXIBLE SLIDING CORRELATOR FOR DIRECT SEQUENCE SPREAD SPECTRUM SYSTEMS

BACKGROUND OF THE INVENTION

This invention relates to the use of spread spectrum or Code Division Multiple Access (CDMA) communications techniques in cellular radio telephone systems. More particularly, the invention relates to receivers used in direct sequence spread spectrum (DS-SS), or "traditional" direct-sequence CDMA systems.

CDMA or spread spectrum communications have been in existence since the days of World War II. Early applications were predominantly military oriented. However, today there has been increasing interest in using spread spectrum systems in commercial applications. Examples include digital cellular radio, land mobile radio, and indoor and outdoor personal communications networks. Commercial operations of the cellular telephone industry continue to grow, and users continue to demand flexible data transfer rates as a key feature in newer communications systems.

CDMA allows signals to overlap in both time and frequency, as illustrated in FIG. 1. Thus, all CDMA signals share the same frequency spectrum. In either the frequency or the time domain, the multiple access signals appear to be on top of each other. In a CDMA system, an information data stream (e.g., speech) to be transmitted is impressed upon a much higher bit rate data stream known as a spreading code signal, a signature sequence or a code sequence. The signature sequence, which has a random appearance, can be generated by a pseudorandom code generator, and replicated in an authorized receiver. The information data stream can be combined with the signature sequence by effectively multiplying the two bit streams together. Combining the higher bit rate signature sequence with the lower bit rate information data stream is called coding or spreading the information data stream signal. Each information data stream or channel is allocated a unique spreading code or signature sequence. A plurality of coded information signals are modulated and transmitted on a radio or carrier wave as a modulated composite signal. Each of the coded signals overlaps all of the other coded signals, as well as noise-related signals, in both frequency and time. The modulated composite signal of multiple coded signals is received at a receiver and is demodulated into a baseband frequency. The demodulated composite signal, or baseband signal, can also be referred to as a complex signal because it typically contains both real and imaginary components. A coded signal is extracted and isolated from the demodulated composite signal by correlating the coded signal using the same signature sequence that was used to create the coded signal.

Typically, the information data stream and the signature sequence are binary with the bits of the signature sequence being known as "chips". In traditional direct-sequence CDMA or spread spectrum systems, a signature sequence having N chips is used to represent one bit or data symbol of the information data stream. An entire transmitted N-chip sequence is referred to as a transmitted symbol.

In particular, FIGS. 2 and 3 illustrate how information signals in a CDMA system are encoded and decoded. Two different data streams (a) and (d) are shown graphically in FIG. 2, and represent digitized information to be communicated over two separate communication channels as Signal 1 and Signal 2, respectively. Signal 1 is modulated using a unique signature sequence having a high bit rate, and is thereby encoded as shown in signal graph (b) of FIG. 2. The term "bit" refers to one digit of the information signal. The term "bit period" refers to the time period between the beginning and the end of the bit signal. Accordingly, the chip period refers to the time period between the beginning and the end of one digit of the high rate signature sequence signal. The bit period is much greater than the chip period. The result of this modulation, which is essentially the product of the signature sequence and the data stream, is shown in signal graph (c) of FIG. 2. In Boolean notation, the modulation of two binary waveforms is essentially an exclusive-OR operation. A similar series of operations is carried out for Signal 2 as shown in signal graphs (d)–(f) of FIG. 2. In practice, of course, many more than two coded information signals are spread across the frequency spectrum available for cellular telephone communications.

Each coded signal is used to modulate an RF carrier using any one of a number of modulation techniques, such as Quadrature Phase Shift Keying (QPSK). Each modulated carrier is transmitted over an air interface. At a radio receiver, such as a cellular base station, all of the modulated carrier signals that overlap in the allocated frequency bandwidth are received together, and are effectively added to form a composite of the modulated carrier signals, or a composite transmission signal. The composite of modulated carrier signals is demodulated to the appropriate baseband frequency, and the result is a composite or sum of the individually coded signals. For example, signal graph (c) of FIG. 3 is a composite or sum of the individually coded signals of signal graphs (a) and (b) of FIG. 3, i.e., is a composite baseband signal. The composite baseband signal can have in-phase and out-of-phase components, i.e., real and imaginary components, and can also be referred to as a complex baseband signal.

The original data streams can be extracted or decoded from the composite baseband signal. For example, signal 1 can be decoded by multiplying the composite baseband signal in the signal graph (c) of FIG. 3 with the unique signature sequence used originally to encode signal 1, as shown in the signal graph (d) of FIG. 3. The resulting signal is analyzed to decide the polarity (high or low, +1 or −1, "1" or "0") of each information bit period of the signal.

These decisions can be made by taking an average or majority vote of the chip polarities during one bit period. Such "hard decision" making processes are acceptable as long as there is no signal ambiguity. For example, during the first bit period in the signal graph (f), the average chip value is +0.67 which readily indicates a bit polarity +1. Similarly, during the subsequent bit period, the average chip value is −1.33. As a result, the bit polarity was most likely a −1. Finally, in the third bit period, the average is +0.80 which indicates a bit polarity of +1. However, whenever the average is zero, the majority vote or averaging test fails to provide an acceptable polarity value.

In most situations, a "soft decision" making process is used to determine the bit polarity. For example, an analog voltage proportional to the received signal after despreading can be integrated over the number of chip periods corresponding to a single information bit. The sign or polarity of the net integration result indicates that the bit value is a +1 or −1.

CDMA receivers often contain a RAKE receiver. In mobile communication systems, signals transmitted between base and mobile stations typically suffer from echo distortion or time dispersion, caused for example by signal reflections from large buildings or nearby mountain ranges. Multipath dispersion occurs when a signal proceeds to the receiver along not one but many paths so that the receiver hears many echoes having different and randomly varying delays and amplitudes. Typically a RAKE receiver "rakes" all the multipath contributions together. A CDMA RAKE receiver individually detects each echo signal using a correlation method, corrects for different time delays, and adds the detected echo signals algebraically (with the same sign).

Sliding correlators can be used in spread spectrum or CDMA receivers to perform the correlation/extraction process, and are typically capable of doing so relatively quickly. In particular, a conventional sliding correlator can correlate the baseband signal with a portion of a signature sequence used to spread the signal. The signature sequence portion is also known as a local code section, and is correlated at a rate equal to the chip rate. The chip rate is the inverse of a time period of a chip in the signature sequence as broadcasted. Sliding correlators are sometimes known as matched filters, since they can be used to search for a match between a received and sampled baseband signal and section of a signature sequence.

Sliding correlators can be used, for example, in the conventional spread spectrum receiver shown in FIG. 4, which includes an antenna 40, Radio Frequency (RF) section 42, and a baseband processor 44. FIG. 5 shows an internal configuration of the baseband processor 44 of FIG. 4, wherein a complex baseband signal 50 is input to a sampler 52. The sampler 52 samples the baseband signal at a specified rate. The baseband signal can be sampled, for example, twice per chip. The samples are provided to a RAKE receiver 54, a set of early-late gates 58 and an initial acquisition and search unit 56. The RAKE receiver 54 detects the signal, and the early-late gates 58 provide a multipath delay estimate to the RAKE receiver. The unit 56 provides initial acquisition and search functions that are typically necessary in a spread spectrum receiver. A signature sequence is typically broadcast from beginning to end, and then repeated. The signature sequence can be unmodulated, partially modulated, or fully modulated by information symbols, depending on whether the system has data only, pilot symbols, or a pilot channel. Initial acquisition refers to a process of generally determining which portion of the signature sequence is currently being broadcast. In contrast, searching refers to a process of precisely determining which portion of the signature sequence is currently being broadcast, so that data can be extracted from the broadcast signal. A sliding correlator can reside, for example, in the unit 56.

FIG. 6 shows a block diagram of a conventional sliding correlator 600 having a delay line 604, delay taps 606, multiplying taps 608, a summer 610, and a magnitude square 612. The baseband signal is sampled uniformly with samples 710, wherein each chip 712 is sampled twice, as shown in FIG. 7. The baseband samples 710 are provided as an input signal 602 to the delay taps 606. A signal is uniformly sampled when the time between samples is constant. The series of delay taps 606 forms the delay line 604, so that the delay line 604 effectively functions as a first-in-first-out (FIFO) register, or queue. Since there are two samples per chip, the sample values move from one delay tap to the next delay tap at twice the chip rate. The sample values present in the delay taps 606 are provided to the multiplying taps 608, where they are multiplied by tap coefficients that correspond to a designated spreading code or signature sequence of a signal from which data is to be extracted. The resulting values are then added in the summer 610. An output of the summer 610 is provided to magnitude square 612, which outputs a number that is the square of a magnitude of the output from the summer 610. The output of the magnitude square 612 can be used to identify and acquire a signal that was encoded with the designated signature sequence.

Despite the numerous advantages afforded by CDMA, the capacity of conventional CDMA systems is limited by the decoding process. Because many different user communications overlap in time and frequency, the task of correlating the correct information signal with the appropriate user is complex. Although sliding correlators are relatively fast, they are also costly to implement because they require a relatively large number of gates on a Very Large Scale Integrated (VLSI) chip and consume relatively large amounts of power. Accordingly, sliding correlators having an improved cost-to-utility ratio are desirable.

SUMMARY OF THE INVENTION

According to an exemplary embodiment of the invention, a flexible sliding correlator for use in a spread spectrum receiver divides baseband signal samples into different groups, associates each group with a different section or portion of a spreading code or signature sequence, and combines the signal samples with corresponding values in the signature sequence section. The groupings and signature sequence sections can be changed during operation of the receiver to maximize performance of the receiver under different or changing conditions. In addition, the sample and signature sequence value combinations can be further combined in different ways, and the further combinations can be changed during operation of the receiver. The flexible sliding correlator can be adaptively configured during operation of the receiver by changing the grouping of the baseband samples, the signature sequence sections used to process each group, and the combination of group processing results. According to another aspect of the invention, the baseband signal can be sampled either uniformly or non-uniformly. The phase and frequency of the baseband sampling can be adjusted during operation of the receiver so that samples are taken very close to the optimum sampling position, at the peak of a chip waveform in the baseband signal.

BRIEF DESCRIPTION OF THE DRAWINGS

Other objects and advantages of the invention will become apparent to those skilled in the art from the following detailed description of preferred embodiments, when read in conjunction with the accompanying drawings. Like elements in the drawings have been designated by like reference numerals.

DETAILED DESCRIPTION

Figure 8A:
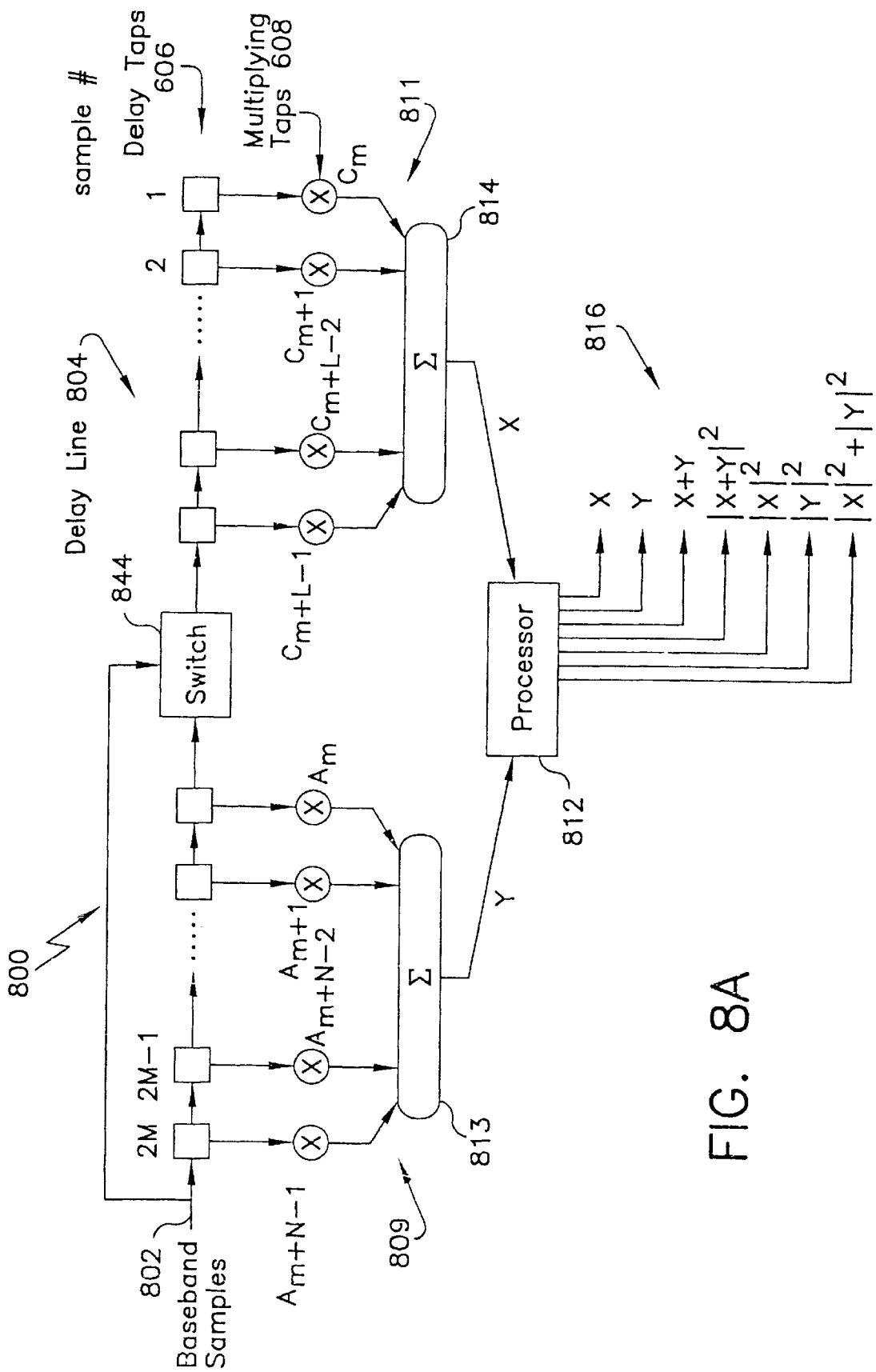
FIGS. 8A–C are block diagrams of flexible sliding correlators according to exemplary embodiments of the invention.

FIG. 8A shows a flexible sliding correlator 800 according to an exemplary embodiment of the invention. As shown in FIG. 8A, the flexible sliding correlator 800 includes a delay line 804 made up of a plurality of delay taps 606 connected in series to form a queue. Samples are introduced into the delay line 804 via an input line 802. Each of the delay taps 606 connects to one of a plurality of multiplying taps 608. The multiplying taps 608 are divided into two groups, and the collective outputs of one group are provided to a first summer 813, and the collective outputs of the other group are provided to a second summer 814. The outputs of the summers 813 and 814 are provided to a processor 812, which variously combines the outputs of the summers 813 and 814 to generate outputs 816 such as: a) X; b) Y; c) X+Y; d) $|X+Y|^2$; e) $|X|^2$; d) $|Y|^2$; and e) $|X|^2+|Y|^2$. X and Y represent signals having both magnitude and phase, and $|X|$ and $|Y|$ represent magnitude of the signals X and Y. Processor 812 can be programmable, providing only those outputs desired at a particular time. For example, the processor 812 can be configured to compute all possible outputs, and then programmably select which are sent out. A switch 844 is also provided in the delay line 804 between a first group of delay taps corresponding to the code A, and a second group of delay taps corresponding to the code C. The switch 844 can pass values from the first group of delay taps to the second group of delay taps, or can provide values from the input line 802 directly to the second group of delay taps.

According to an aspect of the invention, chip samples can be advanced through the delay line 804 at the sampling rate, where the value of the sampling rate is equal to the number of samples per chip multiplied by the chip rate.

Although the flexible sliding correlator 800 is shown in FIG. 8A with the multiplying taps 608 divided into two groups 809 and 811, the multiplying taps 608 can alternatively be divided into more than two groups with corresponding summers and additional switches, or can be organized as one group. In addition, the groups can be differently or similarly sized according to individual requirements of each situation.

Although the flexible sliding correlator 800 is shown in FIG. 8A with a delay line 804, the delay line function can be alternatively implemented using a circular buffer and incremented addresses, so that power costly data transfers are avoided.

Portions or sections of one or more signature sequences, hereafter referred to as local code sections, can also be variously associated with the groups. For example, one group of multiplying taps can contain coefficients corresponding to a local code section of a first signature sequence, and another group of multiplying taps can contain coefficients corresponding to a local code section of a second signature sequence. Alternatively, multiplying taps of different groups can contain coefficients corresponding to different code sections of the same signature sequence, and the code sections can be contiguous (i.e., adjacent sections within the signature sequence) or non-contiguous. Outputs of the summers corresponding to the different groups of multiplying taps can also be variously combined.

For example, where a goal is to identify a long signature sequence, or a location within a long signature sequence, a flexible sliding correlator having two groups of multiplying taps can be especially useful. One of the two groups can be assigned a set of coefficients that corresponds to a first local code section of the signature sequence, and the other group can be assigned a set of coefficients that corresponds to a second local code section of the signature sequence, where the first and second local code sections are chosen to be non-contiguous. In such a case, one of the local code sections will be recognized first, and then the other local code section will be recognized after the chips separating the two local code sections have passed through the delay line. Accordingly, the two recognitions and the delay between the recognitions (corresponding to the number of chips separating the local code sections) can together be used to identify the signature sequence. The first recognition can also be used to tentatively identify the signature sequence, and the delay and the second recognition can be used to confirm the tentative identification.

Alternatively, if one local code section can be used to reliably identify the signature sequence, then only one recognition by either of the local code sections is necessary, and a time saving can be realized. For example, if the two local code sections are spaced equidistant within the signature sequence, then at most half of the signature sequence must pass through the delay line before a recognition occurs. In other words, the signature sequence can be identified in half the average time that would otherwise elapse before identification if the sliding correlator required recognition of both local code sections and the delay between them, or if the sliding correlator contained coefficients corresponding to only one local code section. Those skilled in the art will recognize that this concept can also be implemented with more than two code sections.

The flexible sliding correlator can also be used in situations where it is desirable to make coherent correlation lengths short. Short coherent correlation is correlation where values are coherently combined. e.g., coherently added. Coherent addition means that values having both magnitude and phase are added, while non-coherent addition means that values having only magnitude or magnitude squared are added. Non-coherent correlation can be desirable, for example, when there is frequency error or when a communication channel is changing phase rapidly, as when a mobile station is located in a car and the car moves into an area where the signal is reflected differently and the signal path length changes. In this situation, chip samples in a series corresponding to a large local code section can change phase relative to each other from the beginning of the section to the end of the section. If the phase change is sufficiently large and the samples are coherently added, then samples from the beginning of the section can cancel samples from the end of the section, thus reducing the ability of the sliding correlator to recognize the local code section. To avoid this, the flexible sliding correlator can be configured so that the large local code section is divided into two adjacent local code sections, where multiplying taps and their coefficients and corresponding summers are grouped accordingly. Thus, samples from the beginning of the large local code section can be multiplied by coefficients in one of the groups of multiplying taps and summed, and samples from the end of large local code section can be similarly processed by the other group of multiplying taps and summed. The two sums can then be non-coherently added, for example as $|X|^2+|Y|^2$ as shown in FIG. 8A.

If conventional use of the flexible sliding correlator is desired, then the groups of multiplying taps can be organized to correspond to adjacent local code sections, and the sums corresponding to the groups can be coherently added. If the received signal is strong, then one or more of the groups can be turned off to reduce power consumption.

According to another aspect of the invention, the flexible sliding correlator can also be configured to advance chip samples through the delay line 804 at a rate of a local clock signal provided in the spread spectrum receiver, instead of at the sampling rate. The local clock rate is preferably greater than the sampling rate so that correlation can be performed more quickly. The chip samples can be samples from a previously received portion of a broadcast signal that are stored in a buffer (not shown), and then provided to the delay line at the local clock rate. The multiplying tap coefficients would be changed after each pass of the chip samples.

This arrangement can be particularly useful during the initial acquisition phase, when the goal is to quickly locate the position of a broadcast signal in a signature sequence. An elapsed time since the portion of the signal corresponding to the stored chip samples was received is tracked, and this elapsed time together with the determined location of the chip samples in the signature sequence indicates a current location of the signal in the signature sequence. In this way the flexible sliding correlator can be used to determine and thus acquire the current location of a broadcast signal in a signature sequence.

Alternatively, the current location of a broadcast signal in a signature sequence can be determined by holding a series of chip samples stationary in the delay line 804, and streaming a sequence of coefficients through the multiplying taps at the local clock rate. In this way the multiplying taps function in a fashion similar to a shift register through which the sequence moves. The sequence of coefficients corresponds to at least a portion of the signature sequence being sought, and can correspond to the entire signature sequence. The coefficients can be streamed through the multiplying taps until the series of chip samples being held in the delay line 804 is matched with a portion of the sequence. If no match has been found after the entire sequence of coefficients of the signature sequence has been streamed through the multiplying taps, then a sequence of coefficients corresponding to a different signature sequence can be streamed through the multiplying taps. Alternatively, the multiplying taps can be divided into a plurality of groups, and a different signature sequence can be streamed through each group so that the different sequences are streamed simultaneously. A buffer (not shown) can also be provided to store the coefficients and provide them to the multiplying taps.

This technique of processing the chip samples at a local clock rate instead of at the chip rate can also be used in the search mode. For example, this technique can be useful in the search mode when the delay is relatively large, as when a signal delay on the order of plus or minus 500 chips is experienced in a signature sequence that is approximately 32,000 chips long.

A hybrid approach is also possible, in which data samples slide by and are correlated to multiple codes or signature sequence sections. The hybrid approach is particularly useful when the flexible correlator groups are the same length.

Figure 8B:
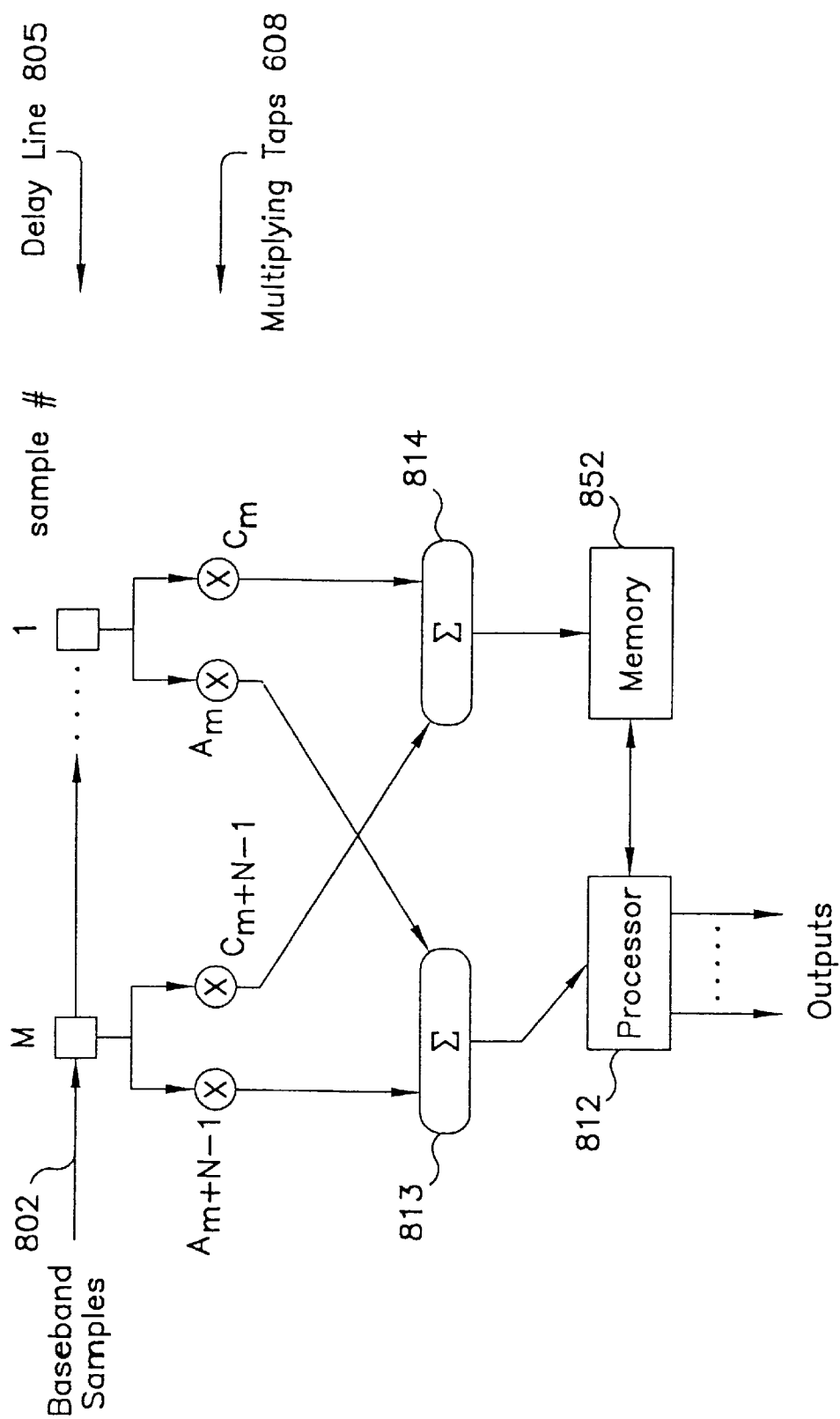

For example, the hybrid approach can be used to reduce the delay line memory requirements, as illustrated in FIG. 8B. Instead of storing 2M samples as in the delay line 804, only M samples are stored in the delay line 805. Correlations to the C code are performed in parallel with correlations to the A code. The correlations to the C code are stored in a memory 852, and then provided to the processor 812 after an appropriate delay. Thus, the memory 852 performs a delay function and a necessary size of the delay line is correspondingly reduced. Two codes A and C are shown in FIG. 8B, but more than two codes can be used. For example, multiplying taps and summers can be provided for each code, and outputs of the summers can be provided to both the processor 812 and the memory 852.

In an extreme case, the delay line 805 is completely eliminated and each sample, as it becomes available, can be multiplied by many different code values (e.g., each code value corresponding to a coefficient in one of the multiplying taps 608) and provided to the memory 852 for later use by the processor 812, and/or directly to the processor 812 for immediate use. Multiplied samples can be summed within the processor 812 in the extreme case, and in other cases as desired. In all cases, when a sample becomes available, all products between the sample and all of the possible code values can be computed if desired. In cases other than the extreme case, all products between samples in the delay line 805 and all of the possible code value can also be computed if desired. In addition, particular products can be selected for particular summers depending on the code sequence. Typically, there are only a small number of code values, for example +1 and −1.

FIG. 8B shows parallel correlation of the A and C codes. If the local clock rate is high enough, these correlations can be performed in series by sharing the multiplying taps. For example, suppose the baseband samples are clocked in every half chip period. Also, suppose the local processing clock period is one eighth of a chip period. Then, there are four clock periods to process data in the delay line 805 before a new sample is shifted into the delay line 805. Thus, two of the clock cycles can be used to multiply data in the delay line 805 with coefficients in the multiplying taps 608 that correspond to code A, and store the result. Then, during the remaining two clock cycles, coefficients corresponding to code C can be loaded into the multiplying taps 608 and multiplied with the data in the delay line 805, and the results can be stored. A state machine (not shown) can be used to control the sequence of operations, and control where the results are summed and stored.

Consider a specific example, in which it is desirable to perform a correlation 128 chips in length by non-coherently adding two 64-chip correlations. Such an example can apply to initial acquisition of a signature sequence. The A code would correspond to the first 64 chips of the signature sequence, and the C code would correspond to the second 64 chips of the signature sequence. When the first 64 chips are in the delay line 805, they are correlated with the C code and the results are stored. Then, 64 chips later when the second 64 chips of the signature sequence are in the delay line 805, the stored C code correlation with the first 64 chips is retrieved from the memory 852, magnitude squared, and added to the magnitude square of the current A code correlation with the second 64 chips. A state machine (not shown) can be used to manage the memory 852 to achieve this result.

Another form of flexibility is in which data samples are processed by the different groups. For example, the data samples processed by one group need not always be passed on to the next group. Consider the embodiment shown in FIG. 8C. Data is initially sampled at 8 samples per chip. The samples are input to decimators 840 and 842, which subsample the data. Each of the decimators 840 and 842 outputs 2 of every 8 samples they receive. The decimators 840 and 842 can have similar or different subsampling phases, relative to each other. Decimator 840 provides data to a first group 860, whereas decimator 842 provides data to switch 844. When switch 844 is controlled to output subsampled data from the decimator 842, the data from decimator 842 are passed to the second group 862. Note that when switch 844 is controlled to output data from the group 860 of the tapped delay line 804, the embodiment in FIG. 8C operates analogously to the embodiment shown in FIG. 8A.

Figure 8C:
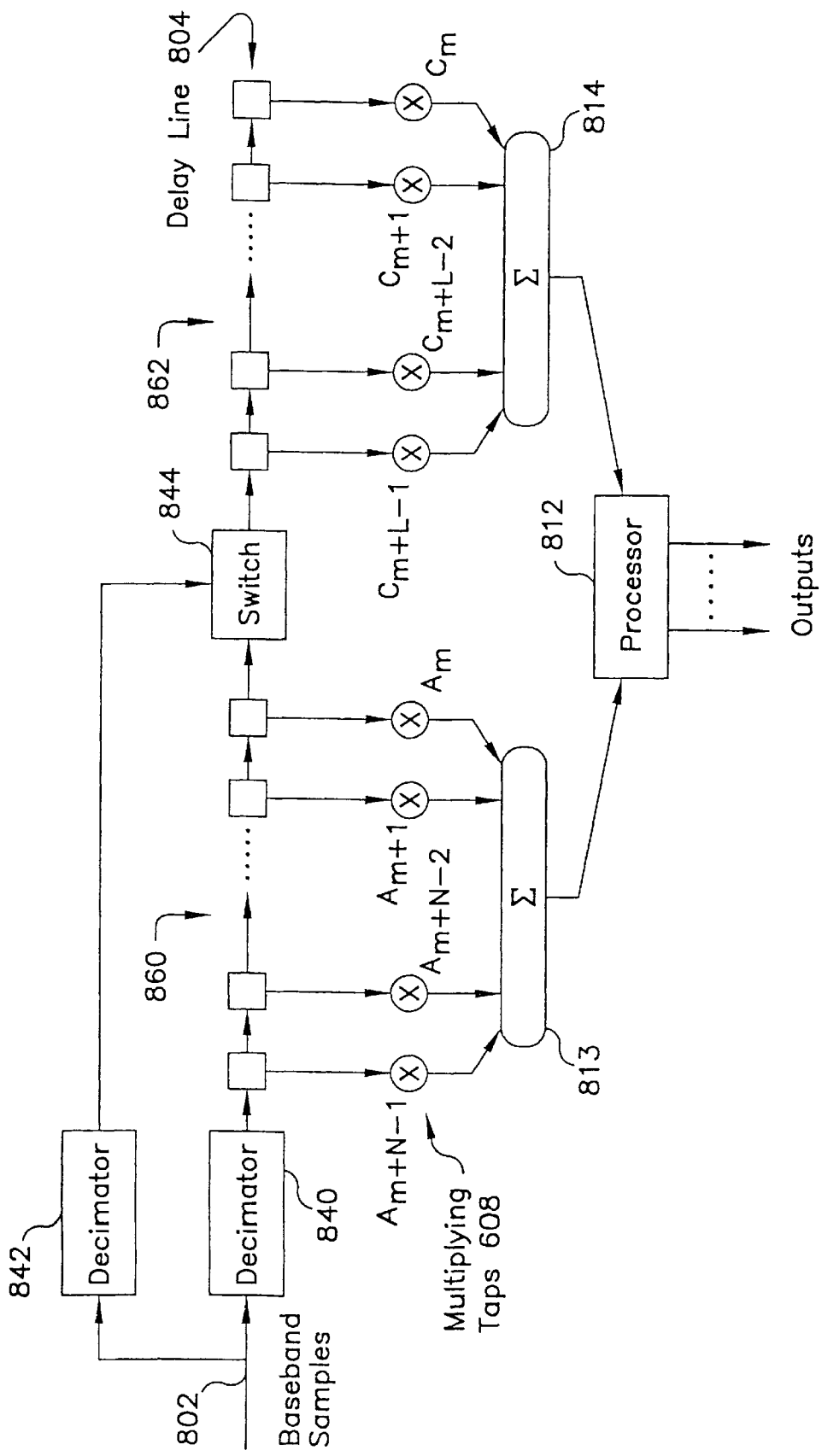

The embodiment shown in FIG. 8C can be used, for example, to perform correlations using 4 samples per chip. If 8 samples per chip are provided to the decimators 840 and 842, then each of the decimators 840 and 842 can output a different pair of from the 8 samples. For example, if the provided samples are numbered 1, 2, 3 . . . , then decimator 840 can output samples 1, 5, 9 . . . , and decimator 842 can output samples 3, 7, 11 . . . . Switch 844 can be controlled to output samples received from decimator 842.

The embodiment shown in FIG. 8C can also be used to perform parallel correlations of two code sequences. For example, decimators 840 and 842 can each output samples 1, 5, 9 . . . , but the codes A and C would correspond to different, contiguous code sections. Switch 844 can be controlled to output samples received from the decimator 842.

The embodiment shown in FIG. 8C can also be configured with more than two groups, with a decimator and summer for each group and switches separating the groups.

While 2 samples per chip are provided to the tapped delay lines shown in FIGS. 8A, 8B and 8C, other numbers of samples per chip can be used. For example, one sample per chip can be used, and the embodiment in FIG. 8C can be used to obtain results at 2 samples per chip instead of 4. Also, the embodiments in FIGS. 8B and 8C can be combined, so that each element in the delay line can have multiple taps as shown in FIG. 8B, thus enabling each of the groups 860 and 862 to correlate to multiple codes.

The flexible sliding correlator can be adaptively configured before or during operation, to provide maximum performance in a variety of situations. The flexible sliding correlator can, for example, be configured by a user before or during operation, or can be automatically configured by a controller (not shown) within the spread spectrum receiver. For example, in a situation where the flexible sliding correlator is operating in a conventional mode where it is divided into two contiguous local code sections that are processed and coherently added, if the controller within the receiver determines that the rate of phase change of the received signal is greater than a predetermined threshold, then the controller can cause the output of one local code section to be non-coherently added to the output of the other local code section. In another example, the flexible sliding correlator can be initially divided into two non-contiguous local code sections. If the controller determines that a strength of the signal falls below a predetermined threshold, then the flexible sliding correlator can be reconfigured so that the two local sections are contiguous, thus providing longer correlation. Those skilled in the art will recognize various other conditions under which the flexible sliding correlator can be advantageously shifted from one configuration to another configuration, thus enhancing performance of the spread spectrum receiver.

Figure 1:
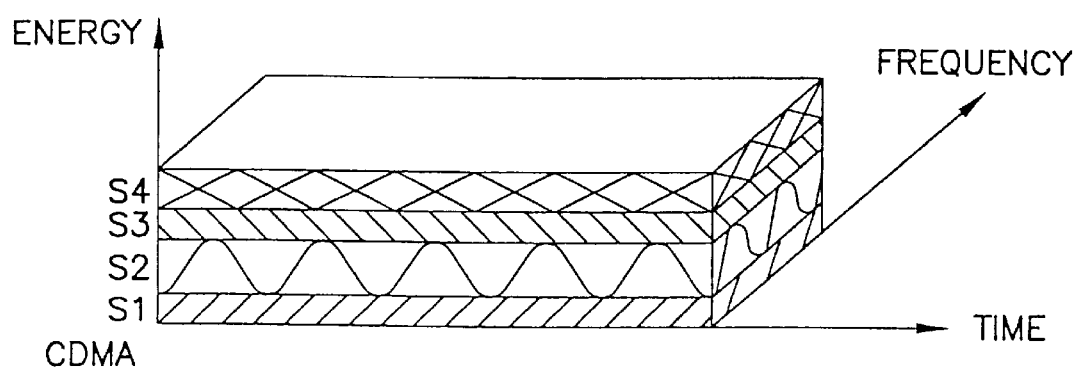
FIG. 1 is a plot of access channels using a CDMA technique.
Figure 2:
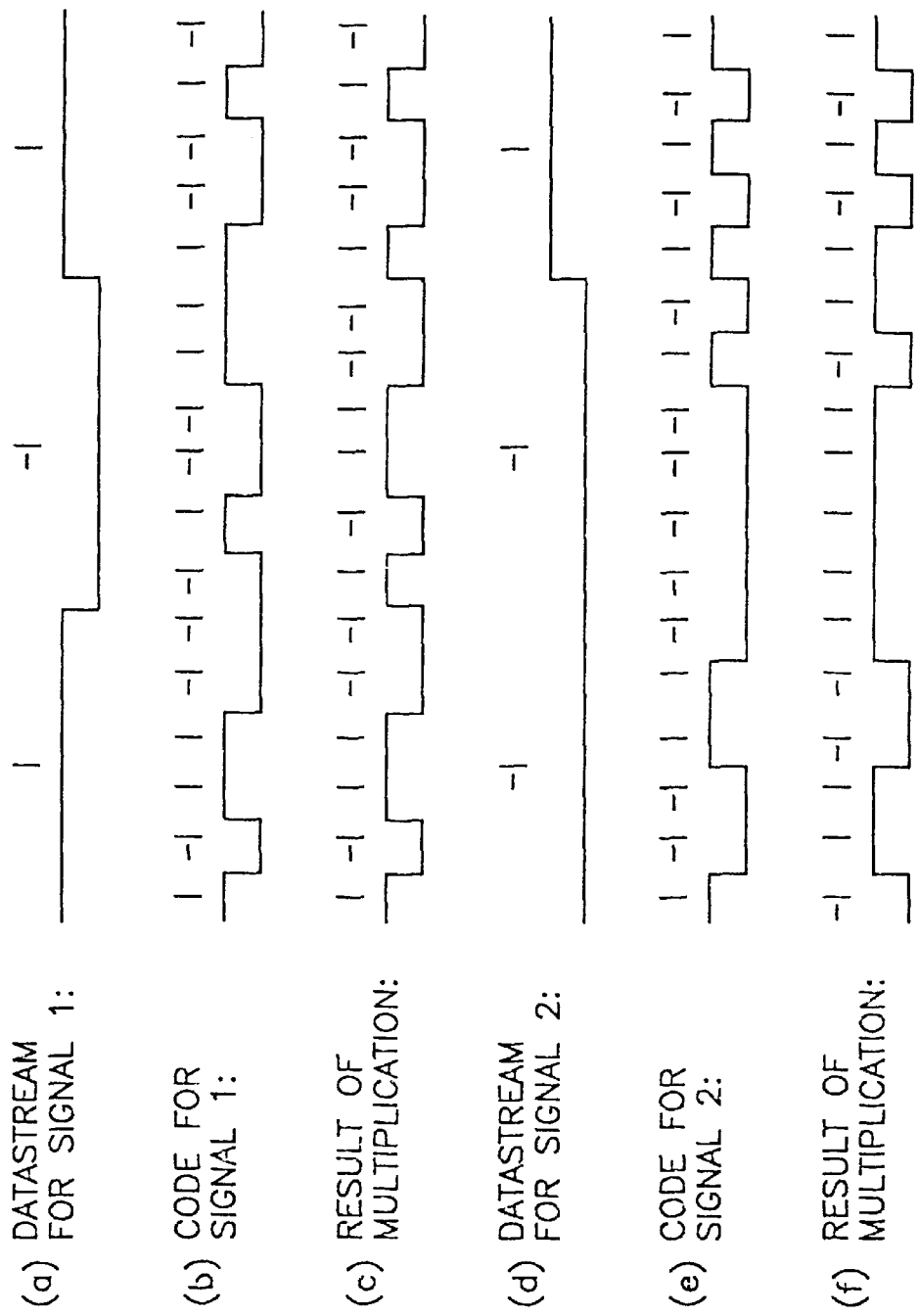
FIG. 2 shows a series of graphs illustrating how CDMA signals are generated.
Figure 3:
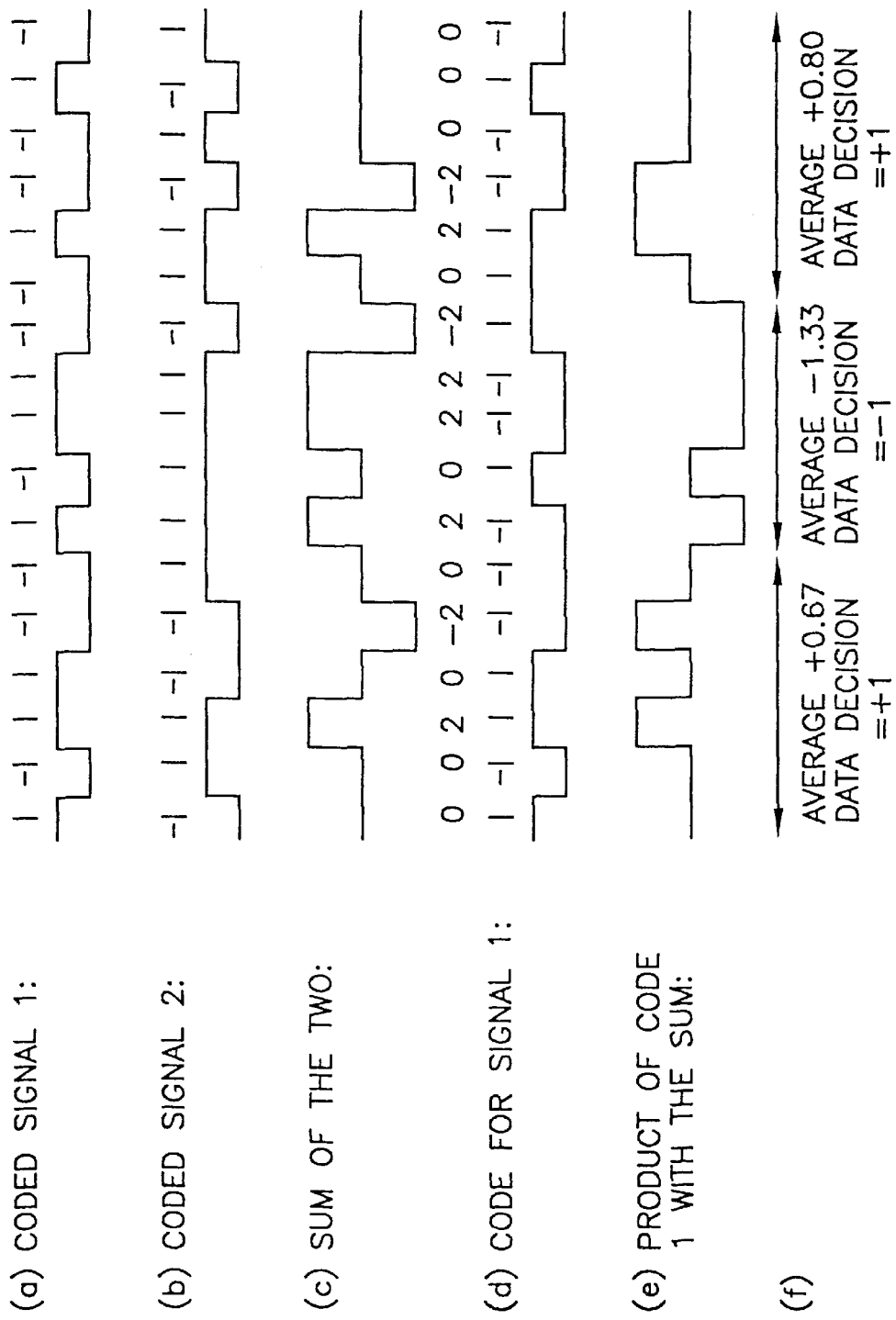
FIG. 3 shows a series of graphs for illustrating how CDMA signals are decoded.
Figure 4:
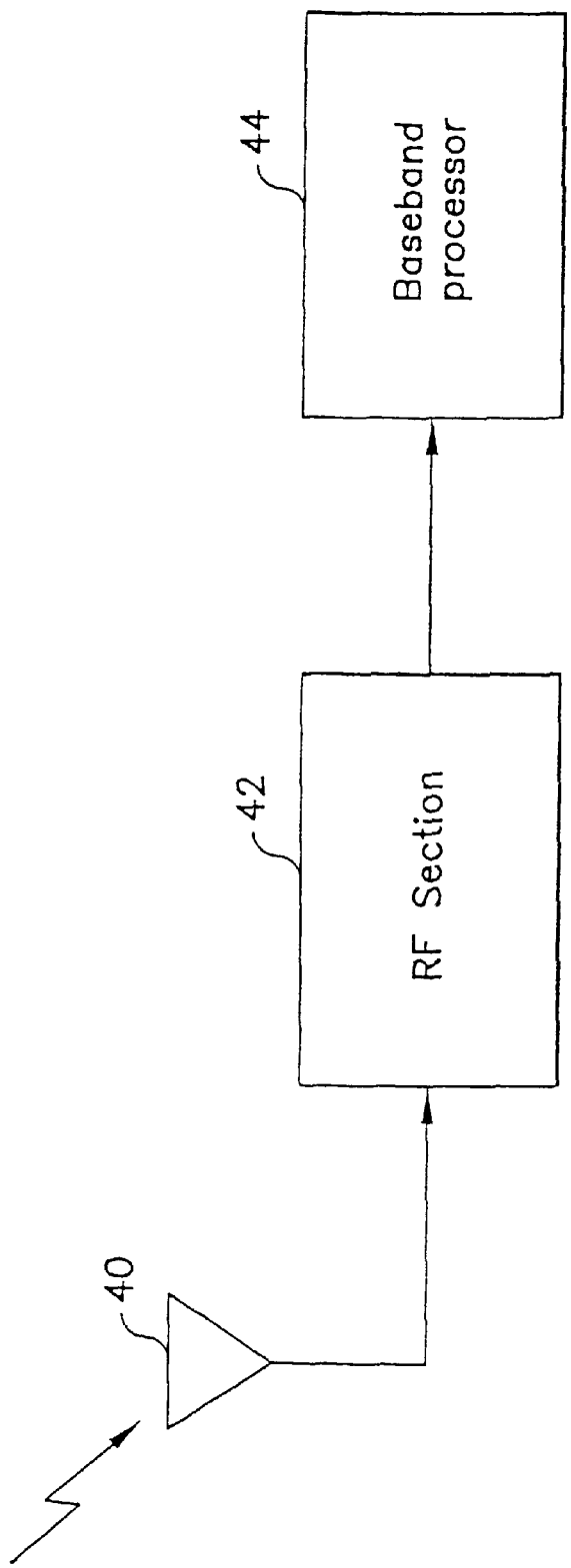
FIG. 4 is a general block diagram of a conventional spread spectrum receiver.
Figure 5:
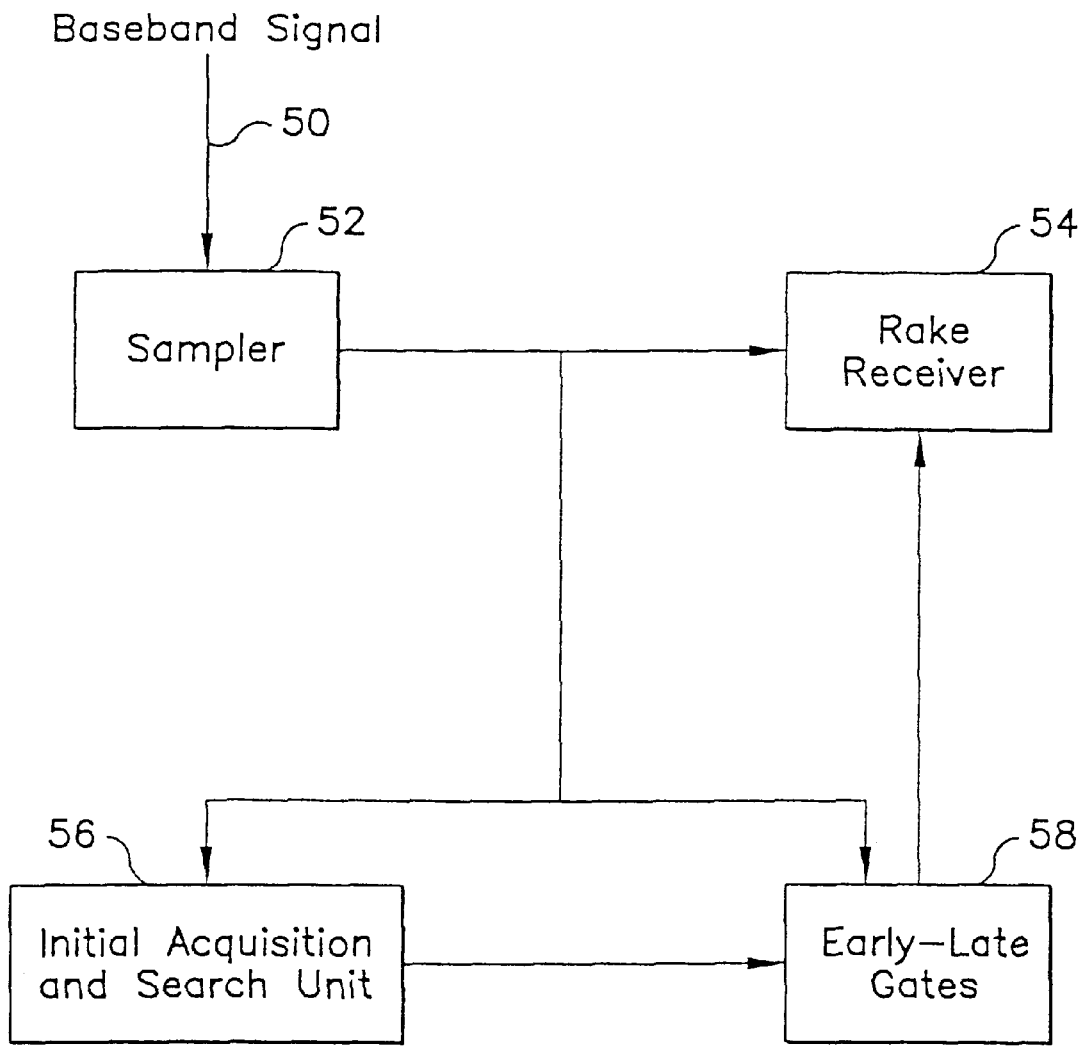
FIG. 5 is a block diagram showing an internal configuration of the spread spectrum receiver of FIG. 4.
Figure 6:
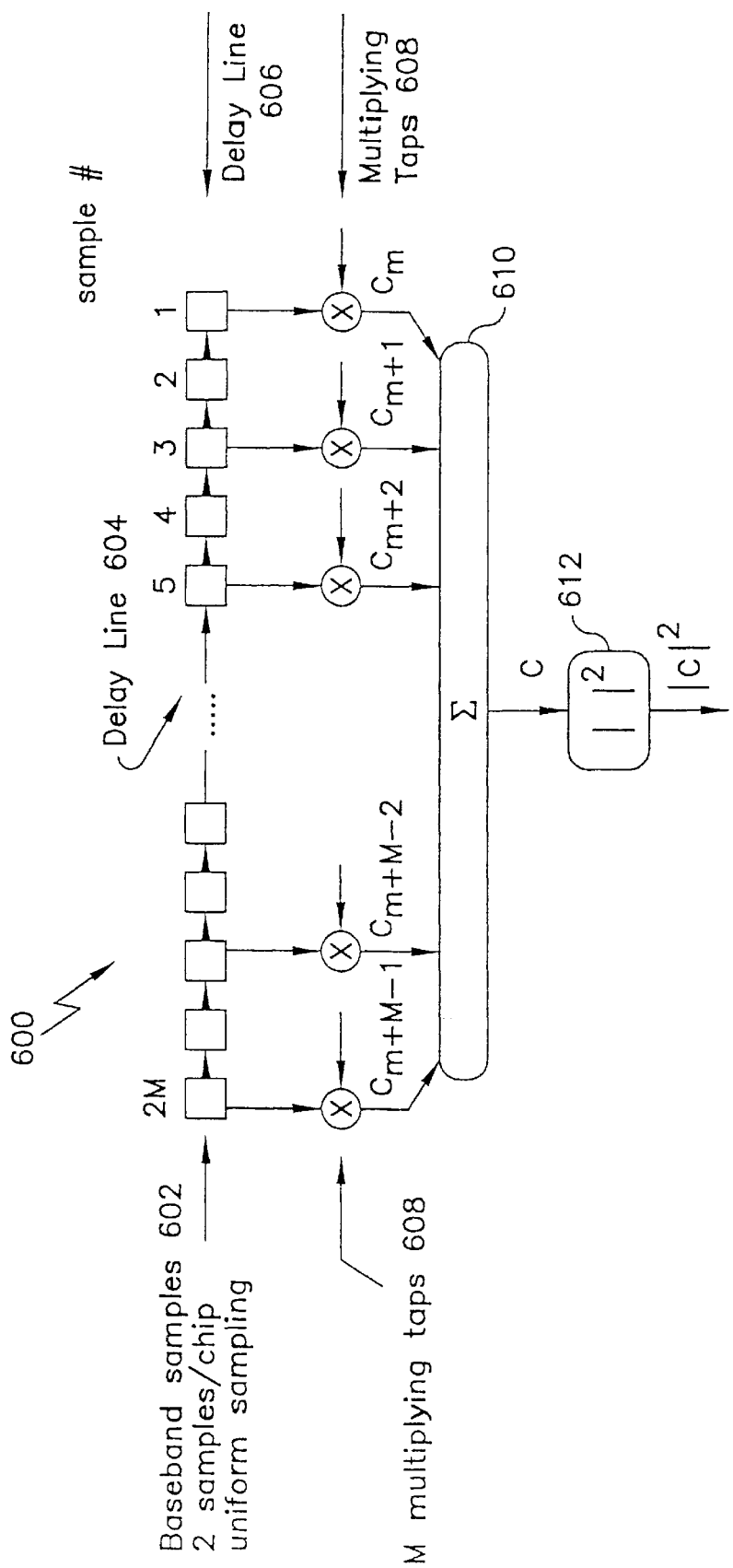
FIG. 6 is a block diagram of a conventional sliding correlator used, for example, in the spread spectrum receiver of FIGS. 4 and 5.
Figure 7:
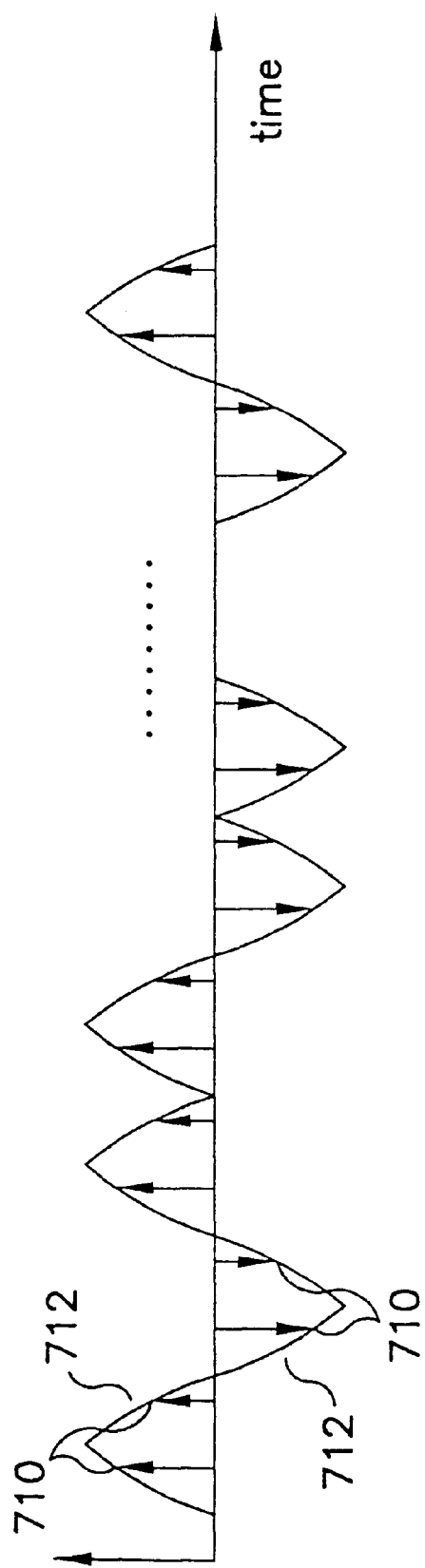
FIG. 7 is a diagram showing conventional, uniform sampling of a baseband signal.
Figure 9:
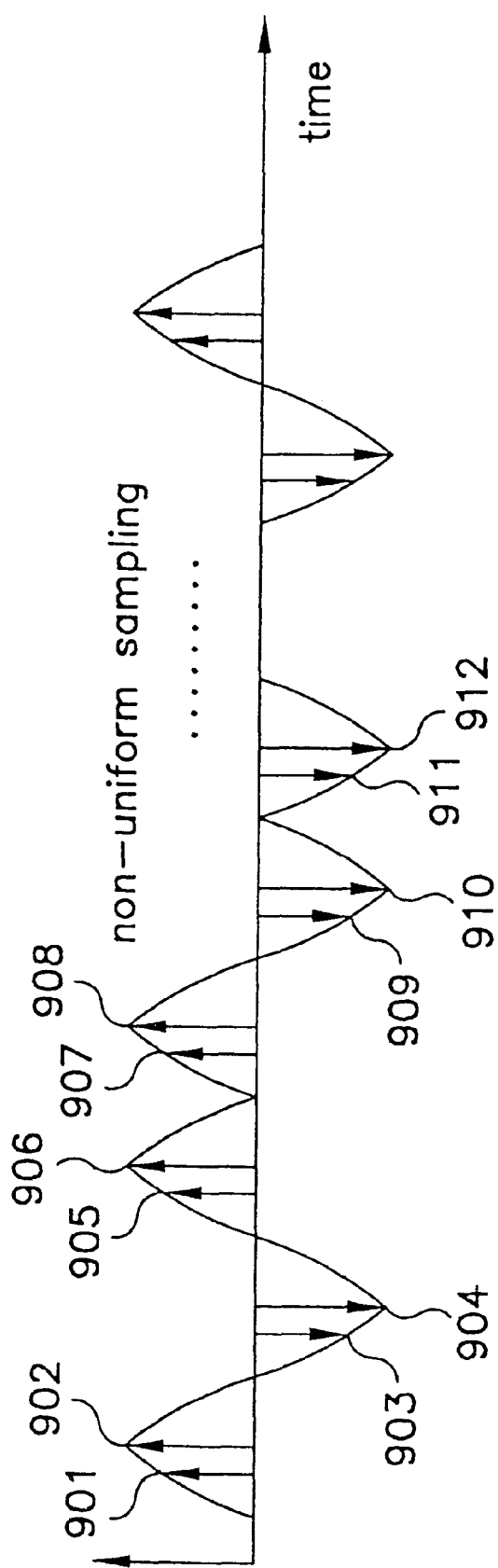
FIG. 9 is a diagram showing non-uniform sampling of a baseband signal according to an exemplary embodiment of the invention.

As shown in FIG. 9, the baseband signal can also be sampled non-uniformly, for example near the optimum sampling position at the peak of a chip waveform at locations 901–912. Where information about optimum sampling positions for the baseband signal is known prior to sampling, non-uniform sampling can be used from the outset. If information regarding optimum sampling positions is not initially known, then the baseband signal can be uniformly sampled at first, and then later non-uniformly sampled when optimum sampling positions are known. For example, according to a first technique, when a first sample of a chip has a larger magnitude than a second sample of the chip, the first sample is closer to the optimum sampling position of the chip than the second sample. With this information, sampling can be improved by moving the sampling position of the second sample closer to the first sample. According to a second technique, the set of early-late gates 58 shown in FIG. 5 can be used to determine optimum sampling position, by obtaining multiple samples that together indicate an optimum sampling position. Generally, the first technique is faster than the second technique, while the second technique is more accurate. The first and second techniques can be used together in a spread spectrum receiver. Thus, sampling of the baseband can be adaptively adjusted during operation of a spread spectrum receiver to improve the receiver's performance. Typically, the baseband signal is highly oversampled (e.g., 8 samples per chip), and then subsampled by the flexible sliding correlator. The subsampling by the flexible sliding correlator can be either uniform or non-uniform.

Figure 10:
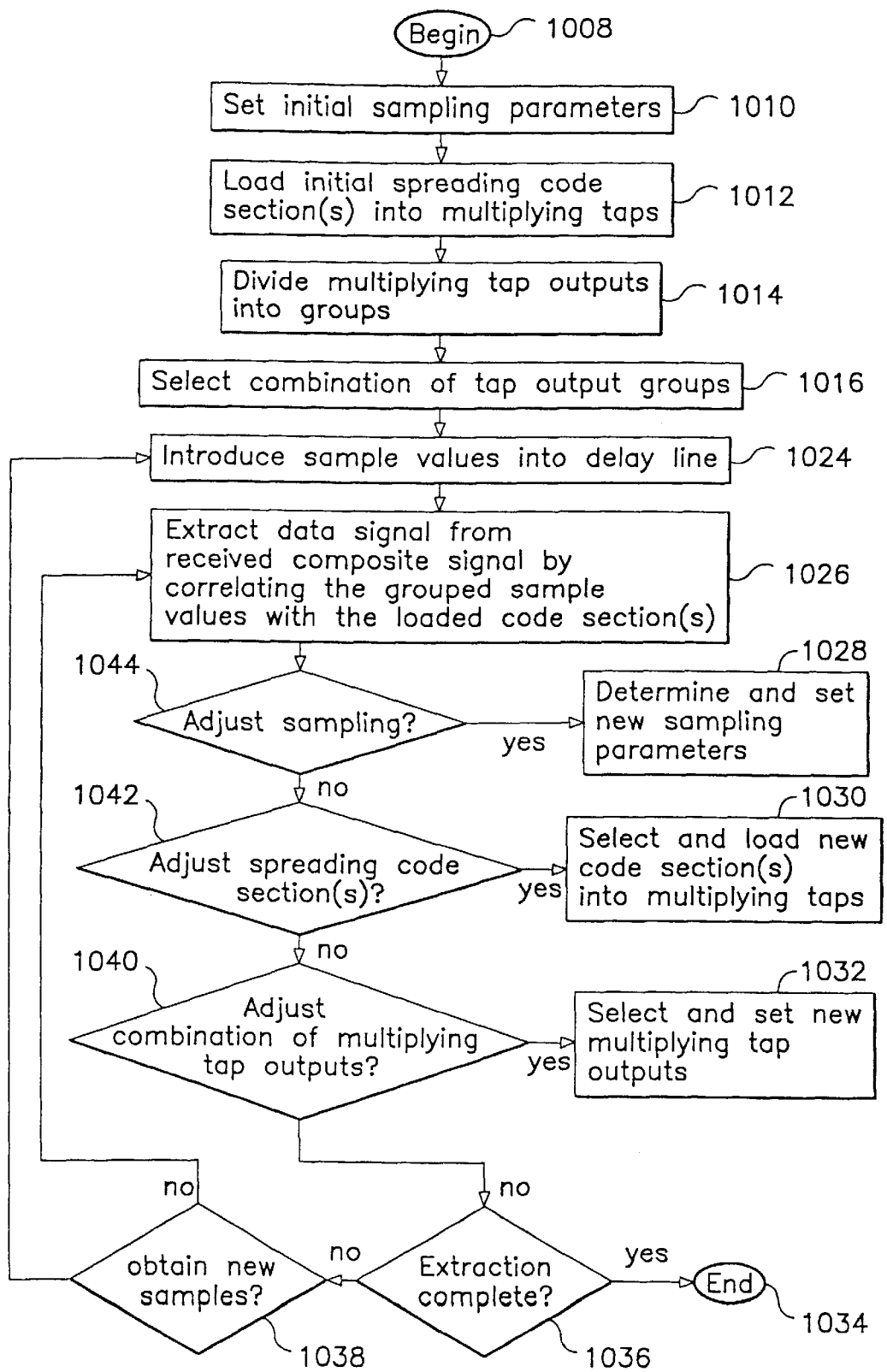
FIG. 10 is a flowchart showing operation of a flexible sliding correlator according to an exemplary embodiment of the invention.

FIG. 10 is a flowchart showing operation of a flexible sliding correlator according to an exemplary embodiment of the invention, such as that shown in FIG. 8A. Those skilled in the art will recognize that the functions shown in FIGS. 10 and 11 occur within a spread spectrum receiver consistent with the invention, and can be coordinated by a microprocessor, digital signal processor (DSP) or other suitable controller (not shown) located within, or connected to, the spread spectrum receiver.

The process begins with step 1008 of FIG. 10, and proceeds to step 1010 where initial sampling parameters are set within the spread spectrum receiver. These parameters can indicate whether the baseband signal is to be sampled uniformly, non-uniformly, how frequently the signal is to be sampled, and so forth. The parameters can be stored as default values within the receiver, or can be initially specified by a user of the receiver. The process then proceeds to step 1012, where initial signature sequence sections are loaded into multiplying taps of the receiver. As with the sampling parameters, the code sections can, for example, be stored as default code sections in the receiver, or can be specified by a user of the receiver. The process proceeds from step 1012 to step 1014, where the multiplying tap outputs are divided into groups. Generally the groups correspond to the loaded code sections, but alternatively the multiplying tap outputs can be divided into different groups as necessary. FIG. 8A shows an example where two code sections A and C have been loaded into the multiplying taps 608, and the outputs of the multiplying taps have been divided into two groups 809, 811 that correspond to the code sections A and C.

From step 1014 the process proceeds to step 1016, where a particular combination of the groups is selected. For example, one or more of the outputs of the processor 812 shown in FIG. 8A are selected. As with steps 1010 and 1012, the division of multiplying tap outputs into groups in step 1014 and the combination selection in step 1016 can occur in accordance with default values stored in the receiver, or with parameters specified by a user.

From step 1016 the process moves to step 1024, where data samples are provided to a delay line, such as the delay line 604 shown in FIG. 8A. In step 1026 the data signal is extracted. This step of extracting includes multiplying the sample values in the delay line with corresponding values in the multiplying taps, summing groups of resulting values output from the multiplying taps, and combining the sums, as indicated for example in FIG. 8A and described further above.

From step 1026 the process moves to step 1044, where a determination is made whether to adjust the sampling parameters. This determination can be made in accordance with, for example, parameters specified by a user of the receiver, or in accordance with a control algorithm within the receiver that seeks to optimize the sampling phase and frequency with respect to the received base bandwidth signal. The adjustment can include shifting from uniform to non-uniform sampling, or vice versa.

If it is determined that the sampling parameters are to be adjusted, then the process moves from step 1044 to step 1028 where the sampling parameters are adjusted and set, and thereafter the process moves to step 1042. If the sampling parameters are not to be adjusted, then the process moves from step 1044 to step 1042.

In step 1042, a determination is made whether to adjust the signature sequence sections. This determination can be made, for example, by a user of the receiver, or can be made by a control algorithm within the receiver in response to changing signal transmission conditions or other factors. For example, if the received composite signal becomes weak and values corresponding to multiple, non-contiguous code sections are stored in the multiplying taps, then the multiplying taps can be loaded instead with values corresponding to contiguous code sections to effectively increase the sensitivity or accuracy of the receiver. In another example, if the receiver is in a fast-acquisition mode where sample values remain statically stored in the delay line as a signature sequence is streamed through the multiplying taps at a local clock rate that is higher than the sampling rate, then the signature sequence sections in the multiplying taps must be "adjusted". In this instance the adjustment would include discarding the value in the last multiplying tap, shifting each remaining value to an adjacent multiplying tap in a direction toward the last multiplying tap, and introducing a next value of the signature sequence into the first multiplying tap.

If in step 1042 it is determined that the signature sequence section values stored in the multiplying taps are to be adjusted, then the process proceeds to step 1030 where values stored in the multiplying taps are changed accordingly. From step 1030 the process moves to step 1040. If in step 1042 it is determined that the values are not to be adjusted, then the process moves to step 1040.

In step 1040, a determination is made whether to adjust the combination of the multiplying tap output groups. If the combination is to be adjusted, then the process moves to step 1032 where the combination is adjusted. The determination whether to adjust the combination of the multiplying tap outputs can be based on, for example, whether the signal is changing rapidly, e.g., fading in signal strength or shifting in phase/delay. In this situation non-coherent addition is desirable for reasons set forth further above, and the combination of multiplying tap outputs would be changed from coherent addition to non-coherent addition. From step 1032 the process moves to step 1036. If in step 1040 it is determined that the combination of multiplying tap output groups is not to be changed, then the process moves from step 1040 to step 1036.

In step 1036 a determination is made whether extraction is complete. If the extraction is complete, then the process moves to step 1034 and ends. If the extraction is not complete, then the process moves to step 1038.

In step 1038, a determination is made whether to obtain new samples. This determination is based on whether samples are being streamed through the delay line. If the samples are being streamed through the delay line, then the process moves to step 1024 and repeats. If the samples are not being streamed through the delay line, for example during fast-acquisition when samples are statically stored in the delay line as signature sequence values are streamed through the multiplying taps, then the process proceeds to step 1026 and repeats.

Since the delay line corresponds to multiplying taps that contain values for signature sequence sections, and since the multiplying tap outputs are grouped, introducing sample values into the delay line effectively divides the sample values into groups corresponding to the code sections and/or the multiplying tap output groups.

Figure 11:
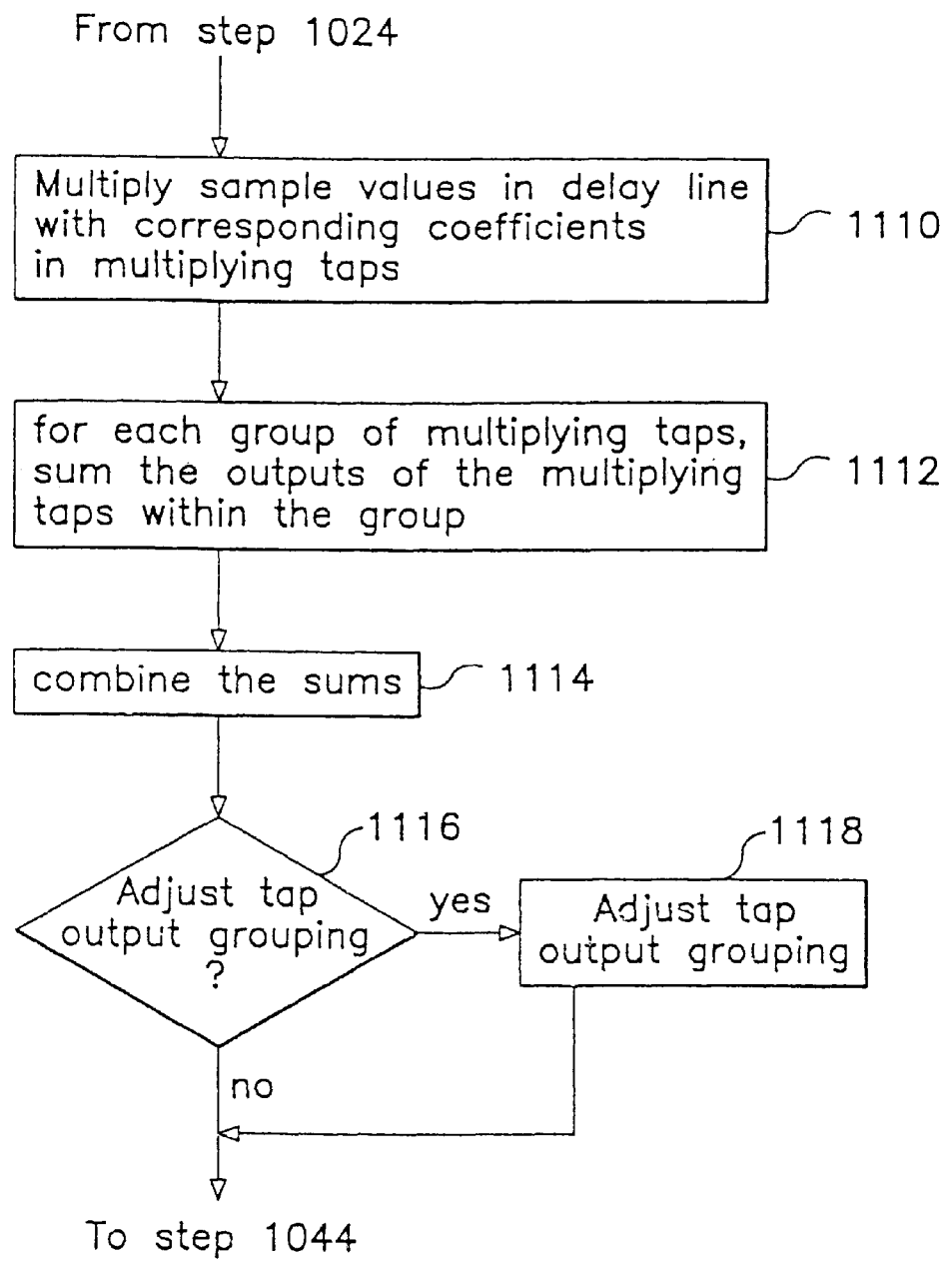
FIG. 11 is a flowchart showing part of the FIG. 10 operation in greater detail.

FIG. 11 shows steps 1110–1114 that correspond to step 1026 of FIG. 10 and show additional detail. In step 1110 the sample values in the delay line are multiplied with coefficients or signature sequence values stored in corresponding multiplying taps, and the multiplied values are provided at the multiplying tap outputs. If the despreading code is +1 or −1, multiplication becomes negating or not negating the value, so that despreading is adding and subtracting. If the despreading code consists of ±1±j, a complex value, multiplication also simplifies. It is preferable to use negating and switching operations as described in U.S. application Ser. No. 08/748755 to Bottomley et al., filed Nov. 14, 1996. Note that in a receiver, multiplication by a spreading code includes conjugating the spreading code.

In step 1112 the multiplied values within each group of multiplying tap outputs are summed, and then in step 1114 the sums are combined.

FIG. 11 also includes step 1116, wherein a determination is made whether to adjust the tap output grouping. If the tap output groups are to be adjusted, then the process moves to step 1118, where the tap output groups are adjusted. The multiplying tap output grouping can be adjusted, for example, when the multiplying tap output groups correspond to signature sequence sections, and new signature sequence sections having different lengths than prior signature sequence sections are loaded into the multiplying taps. Those skilled in the art will note that although FIG. 11 indicates that steps 1116 and 1118 are located between steps 1024 and 1044 of FIG. 10, steps 1116 and 1118 can alternatively be located, for example, between steps 1024 and 1036.

It will be understood that the invention is not limited to the particular embodiments described above and that modifications may be made by persons skilled in the art. The scope of the invention is determined by the following claims, and any and all modifications that fall within that scope are intended to be included therein.

What is claimed is:

1. A spread spectrum receiver, comprising:

an antenna for receiving a composite signal;

processing circuitry for converting the composite signal into a baseband signal;

a sampler for sampling the baseband signal non-uniformly; and a sliding correlator for correlating the non-uniformly sampled baseband signal with at least one section of at least one spreading code, the sliding correlator including a delay line, a plurality of delay taps from the delay line, a plurality of multiplying taps, each multiplying tap connecting to a different one of the plurality of delay taps for multiplying a value carried by the corresponding delay tap to generate an output, and a plurality of summers, each summer summing outputs of the multiplying taps.

2. The spread spectrum receiver of claim 1 wherein the plurality of multiplying taps comprise a plurality of groups of multiplying taps and each summer sums outputs of the multiplying taps of one of the groups of multiplying taps.

3. The spread spectrum receiver of claim 1 further comprising a plurality of delay lines and a plurality of delay taps from each delay line and wherein each summer sums outputs of the multiplying taps corresponding to the same delay line.

4. The spread spectrum receiver of claim 1 wherein each multiplying tap multiplies the value carried by the corresponding delay tap with a plurality of code values corresponding to code sections and each summer sums outputs of the multiplying taps corresponding to the same delay line and same code section.

5. A sliding correlator comprising:
a delay line;
a plurality of series delay taps from the delay line;
a plurality of groups of multiplying taps, each multiplying tap connecting to a different one of the plurality of series delay taps from the delay line for multiplying a value carried by the corresponding delay tap to generate an output;
a plurality of summers, each summer summing outputs of the multiplying taps of one of the groups of multiplying taps to provide a respective sum for each group of multiplying taps such that each respective sum is a sum of less than all of the multiplying taps from the series delay line; and
a processor that generates a squared magnitude of one of the sums for a respective group of multiplying taps such that the squared magnitude is a squared magnitude of a sum of less than all of the multiplying taps from the delay line.

6. The sliding correlator of claim 5, wherein each of the groups of multiplying taps contains values corresponding to a different spreading code.

7. The sliding correlator of claim 5, wherein each of the groups of multiplying taps contains values corresponding to a different section of a spreading code.

8. The sliding correlator of claim 7, wherein the different sections of the spreading code are non-contiguous.

9. The sliding correlator of claim 7, wherein the different sections of the spreading code are contiguous.

10. The sliding correlator of claim 7, wherein an output of at least one of the summers is non-coherently added.

11. The sliding correlator of claim 7, wherein an output of at least one of the summers is coherently added.

12. A sliding correlator comprising:
a delay line;
a plurality of delay taps from the delay line;
a plurality of groups of multiplying taps, each multiplying tap connecting to a different one of the plurality of series delay taps for multiplying a value carried by the corresponding delay tap to generate an output; and
a plurality of summers, each summer summing outputs of the multiplying taps of one of the groups of multiplying taps;
wherein a first one of the groups of multiplying taps has a first number of multiplying taps, a second one of the groups of multiplying taps has a second number of multiplying taps, and the second number is different from the first number.

13. A sliding correlator comprising:
a delay line;
a plurality of delay taps from the delay line;
a plurality of groups of multiplying taps, each multiplying tap connecting to a different one of the plurality of delay taps for multiplying a value carried by the corresponding delay tap to generate an output; and
a plurality of summers, each summer summing outputs of the multiplying taps of one of the groups of multiplying taps;
wherein at least one of the groups of multiplying taps is turned off during operation of the sliding correlator.

14. A sliding correlator, comprising:
a delay line;
a plurality of delay taps from the delay line;
a plurality of multiplying taps, each multiplying tap connecting to a different one of the plurality of delay taps for multiplying a value carried by the corresponding delay tap with a plurality of code values corresponding to code sections to produce a plurality of outputs; and
a plurality of summers, each summer summing outputs of the multiplying taps corresponding to the same code section.

15. The sliding correlator of claim 14, wherein the different code sections correspond to contiguous sections of a spreading code.

16. The sliding correlator of claim 14, wherein outputs corresponding to different code sections are produced in parallel.

17. The sliding correlator of claim 14, wherein outputs corresponding to different code sections are produced sequentially.

18. The sliding correlator of claim 14, wherein only a subset of multiplying taps outputs are produced, corresponding to a subset of code sections.

19. The sliding correlator of claim 14, wherein an output of at least one of the summers is coherently added.

20. The sliding correlator of claim 14, wherein an output of at least one of the summers is non-coherently added.

21. A sliding correlator, comprising:
a plurality of delay lines;
a plurality of delay taps from each delay line;
a plurality of multiplying taps, each multiplying tap connecting to a different one of the plurality of delay taps for multiplying a value carried by the corresponding delay tap with a code value;
a plurality of summers, each summer summing outputs of the multiplying taps corresponding to the same delay line; and
a switch coupled between an output of of a first delay line and an input of a second delay line wherein the switch selectively couples the input of the second delay line to the output of the first delay line.

22. A sliding correlator, comprising:
a plurality of delay lines;
a plurality of delay taps from each delay line;
a plurality of multiplying taps, each multiplying tap connecting to a different one of the plurality of delay taps for multiplying a value carried by the corresponding delay tap with a plurality of code values corresponding to code sections to produce a plurality of outputs; and a plurality of summers, each summer summing outputs of the multiplying taps corresponding to the same delay line and same code section.

23. A sliding correlator, comprising:

a memory for storing received samples;

a plurality of groups of combiners for combining different stored received samples with a code sequence to produce combined values;

a plurality of summers for adding combined values from each group of combiners to produce correlations such that each summer provides a respective sum for each group of combiners such that each respective sum is a sum of less than all of the combiners; and a processor that generates a squared magnitude of one of the sums for a respective group of combiners such that the squared magnitude is a squared magnitude of a sum of less than all of the combiners.

24. A spread spectrum receiver comprising:

an antenna for receiving a composite signal;

processing circuitry for converting the composite signal into a baseband signal;

a sampler for sampling the baseband signal non-uniformly; and a sliding correlator for correlating the non-uniformly sampled baseband signal with at least one section of at least one spreading code, the sliding correlator including a memory for storing received samples, a plurality of groups of combiners for combining different stored received samples with a code sequence to produce combined values, and a plurality of summers for adding combined values from each group of combiners to produce correlations.

* * * * *

UNITED STATES PATENT AND TRADEMARK OFFICE
CERTIFICATE OF CORRECTION

PATENT NO. : 6,363,105 B1
DATED : March 26, 2002
INVENTOR(S) : Sourour et al.

It is certified that error appears in the above-identified patent and that said Letters Patent is hereby corrected as shown below:

<u>Title page,</u>
Item [75], Inventor, "Essam Sourour" address should read -- Cary; --

Signed and Sealed this

Twenty-eighth Day of January, 2003

JAMES E. ROGAN
*Director of the United States Patent and Trademark Office*